US007987879B2

(12) United States Patent
Comardo et al.

(10) Patent No.: US 7,987,879 B2
(45) Date of Patent: Aug. 2, 2011

(54) METHODS AND APPARATUS FOR DENSE PARTICLE LOADING

(75) Inventors: Mathis Paul Comardo, Cypress, TX (US); Stephen Darius Bryant, LaPorte, TX (US)

(73) Assignee: Cat Tech, Inc., Houston, TX (US)

( * ) Notice: Subject to any disclaimer, the term of this patent is extended or adjusted under 35 U.S.C. 154(b) by 1150 days.

(21) Appl. No.: 11/683,012

(22) Filed: Mar. 7, 2007

(65) Prior Publication Data
US 2008/0216918 A1    Sep. 11, 2008

(51) Int. Cl.
*B65B 1/30* (2006.01)
(52) U.S. Cl. ............ 141/83; 141/95; 141/255; 141/392; 239/654; 239/666; 414/304
(58) Field of Classification Search .............. 141/34, 141/67, 83, 94, 95, 255, 256, 285, 286, 392; 239/654, 518, 650, 655, 666, 680, 681, 682, 239/687; 414/288, 287, 293, 294, 304, 160, 414/167, 786; 222/410, 135, 482, 565
See application file for complete search history.

(56) References Cited

U.S. PATENT DOCUMENTS

| 3,563,399 | A | * | 2/1971 | Shivers ......................... 414/808 |
| 3,854,637 | A | | 12/1974 | Muller, Jr. et al. |
| 3,972,686 | A | | 8/1976 | Johnson et al. |
| 3,995,753 | A | | 12/1976 | Millar et al. |
| 4,159,151 | A | | 6/1979 | Wood |
| 4,266,582 | A | * | 5/1981 | Sergent ......................... 141/198 |
| 4,277,205 | A | | 7/1981 | Meunier |
| 4,300,725 | A | | 11/1981 | Moherek |
| 4,306,829 | A | | 12/1981 | Loutaty et al. |
| 4,424,837 | A | | 1/1984 | Farrell |
| 4,433,707 | A | | 2/1984 | Farnham |
| 4,437,613 | A | | 3/1984 | Olson |
| 4,529,337 | A | * | 7/1985 | Hilgraf et al. ................. 406/163 |
| 4,564,328 | A | * | 1/1986 | Loutaty et al. ................ 414/301 |
| 4,609,153 | A | | 9/1986 | van der Lely |
| 4,611,965 | A | | 9/1986 | Dixon et al. |
| 4,685,504 | A | | 8/1987 | Bond et al. |
| 4,776,493 | A | | 10/1988 | Tegel |
| 4,969,494 | A | * | 11/1990 | Chefson ......................... 141/93 |

(Continued)

FOREIGN PATENT DOCUMENTS

EP    0 727 250 A2    8/1996

(Continued)

OTHER PUBLICATIONS

Catalyst Technology Dense Loader Operations Manual, Revised Aug. 1997, 22 pages.

(Continued)

*Primary Examiner* — Gregory L Huson
*Assistant Examiner* — Jason K Niesz
(74) *Attorney, Agent, or Firm* — Patterson & Sheridan, L.L.P.

(57) ABSTRACT

Methods and apparatus enable filling a receptacle with solid particles introduced into the receptacle with a controlled flow rate and pattern of distribution of the particles. A pneumatic loader may dispense the particles into the receptacle with ability to adjust the flow rate and pattern of distribution of the particles. Further, a laser sensor may enable detecting a topographic level of the particles loaded by movement of the laser sensor around a point to make linear measurements across the reactor at multiple angularly offset orientations.

25 Claims, 5 Drawing Sheets

U.S. PATENT DOCUMENTS

| | | | |
|---|---|---|---|
| 4,972,884 A | 11/1990 | Souers et al. | |
| 5,102,223 A | 4/1992 | Uesugi et al. | |
| 5,238,035 A * | 8/1993 | Poussin et al. | 141/286 |
| 5,244,129 A | 9/1993 | Poussin et al. | |
| 5,558,484 A | 9/1996 | Mikulicz et al. | |
| 5,687,780 A | 11/1997 | Minami | |
| 5,731,994 A | 3/1998 | Okubo et al. | |
| 5,950,694 A | 9/1999 | Jama et al. | |
| 6,176,276 B1 | 1/2001 | Maunder et al. | |
| 6,617,601 B1 | 9/2003 | Wiklund | |

FOREIGN PATENT DOCUMENTS

| | | |
|---|---|---|
| FR | 2 288 560 | 5/1976 |
| WO | WO 2006/013240 | 2/2006 |

OTHER PUBLICATIONS

PCT Partial International Search, Application No. PCT/US2008/055909, dated Jun. 13, 2008.

PCT International Search, Application No. PCT/US2008/055909, dated Aug. 27, 2008.

\* cited by examiner

US 7,987,879 B2

METHODS AND APPARATUS FOR DENSE PARTICLE LOADING

BACKGROUND OF THE INVENTION

1. Field of the Invention

Embodiments of the invention generally relate to loading solid particulate materials into a receptacle.

2. Description of the Related Art

Various industries require filling containers such as chemical reactors or silos with solid particles such as catalysts or grains. Random loading of such receptacles creates possible density variations within the receptacle and increased void space between the particles when compared to dense loading techniques that control flow rate and distribution of particles into the receptacle. Relative to this random fill, advantages of dense loaded chemical reactors include providing improved loading yields in the reactor in order to permit lower reactor temperatures and enhance activity per unit volume or efficiency, longer service life to reduce plant stoppages, improved fluid flow due to catalyst bed homogeneity, and reduced bed settling.

Many loading devices include some form of a rotating distributor disc disposed in the path of the particles that are thereby dispensed into the receptacle by gravity and centrifugal force from the disc. Pneumatically powered machines use air flow to propel the particles in a radial direction to evenly fill the receptacle. These pneumatic machines lack mechanical parts susceptible to break down. However, both the prior mechanical and pneumatic loaders suffer from other disadvantages that can make maintenance and adjustment difficult and operational design inefficient, which can then affect ability to achieve dense loading as desired. Further, attempts to automate monitoring of these loading processes from manual measurements with a tape measure proved too complicated and expensive for practical implementation.

Therefore, there exists a need for improved methods and apparatus for loading solid particulate material in a receptacle.

SUMMARY OF THE INVENTION

According to some embodiments of the invention, a loader for dispensing solid particles into a receptacle includes first and second hopper body sections defining an interior volume, wherein a mating relationship between the body sections forms an outlet pathway between the interior volume and an opening to outside of the loader, a gas nozzle disposed along the outlet pathway and directed toward the opening, and a central member coupled to each of the body sections within the interior volume, wherein one of the hopper body sections is adjustable in position along the central member to vary a size of the opening.

For some embodiments, a loader for dispensing solid particles into a receptacle includes a hopper body section defining an interior volume and an outlet pathway between the interior volume and an opening to outside of the loader, a dispersion force imparting element disposed along the outlet pathway, and a laser sensor coupled to the hopper body section, wherein the laser sensor is configured to detect a topographic level of the particles loaded into the receptacle.

In some embodiments, a method of dispensing solid particles into a receptacle includes providing a loader having an outlet pathway between an interior of the loader and an opening to outside the loader, adjusting a size of the opening, supplying the particles to the interior of the loader, and supplying gas to nozzles disposed along the pathway, thereby propelling the particles from the loader and dispensing the particles into the receptacle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally relate to filling a receptacle with solid particles introduced into the receptacle with a controlled flow rate and pattern of distribution of the particles. For example, such solid particles may include catalysts, absorbents, reagents, packing, grains or other food products, chemicals, granulated plastics, pharmaceutical products or crushed materials loaded into the receptacle that may be in the form of a chemical or refinery reactor such as a hydrocarbon refining catalytic reactor, a silo or other storage bin, a truck bed, or a rail car. A laser sensor in some embodiments may enable detecting a topographic level of the particles loaded by movement of the laser sensor around a point to make linear measurements across the reactor at multiple angularly offset orientations. For some embodiments, a pneumatic loader dispenses the particles into the receptacle with ability to adjust the flow rate and pattern of distribution of the particles, which are propelled by gas or air directed through a manifold that disperses the air to nozzles directed so that the air expelled through the nozzles forces the particles out of the loader.

Figure 1:
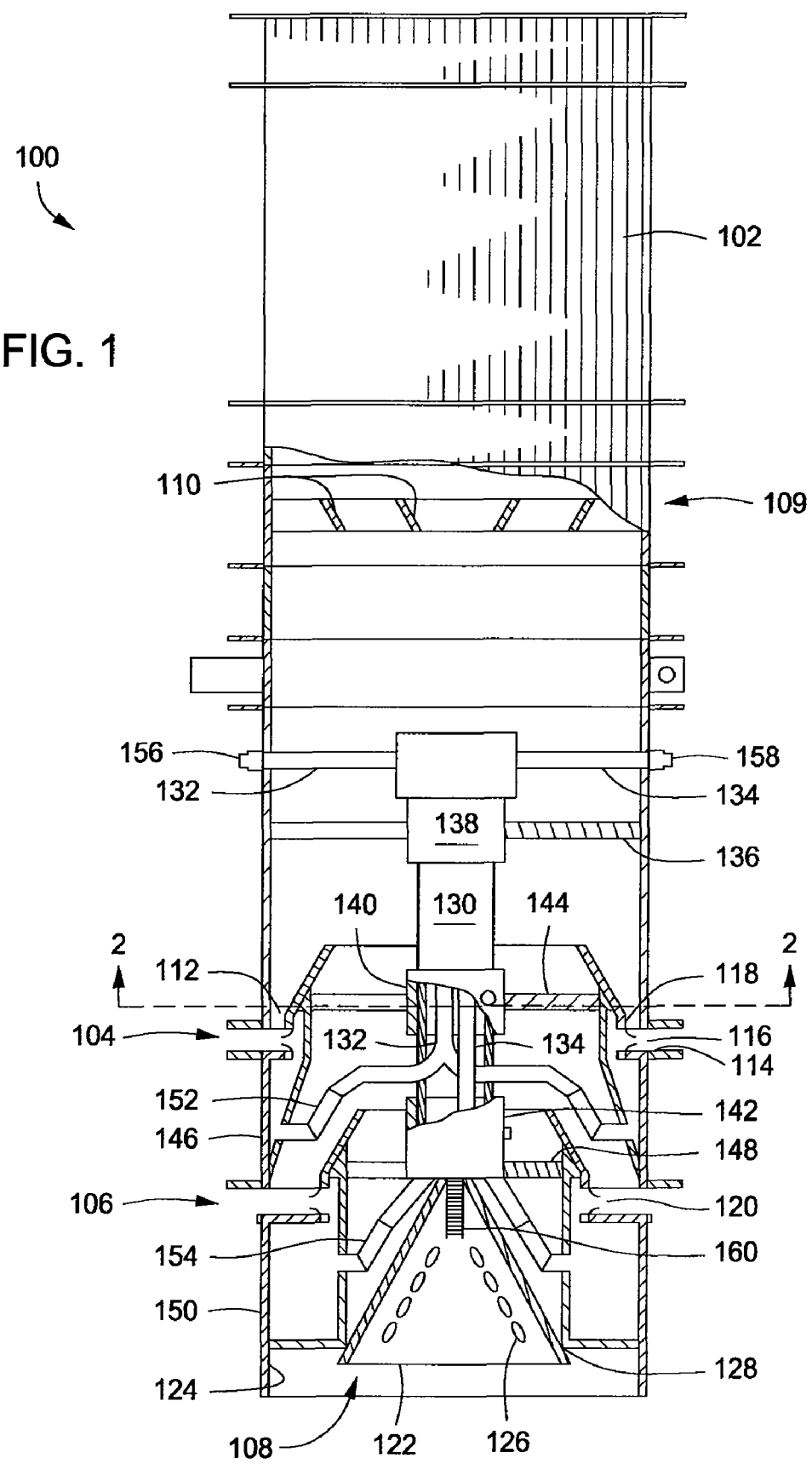
FIG. 1 is a partial cross section of a pneumatic dense loader, according to one embodiment of the invention.
Figure 2:
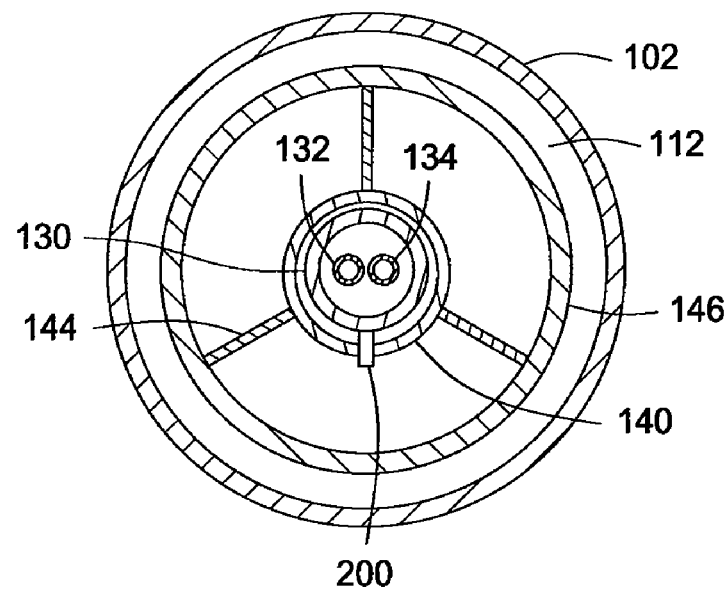
FIG. 2 is a cross section view of the loader taken across line 2-2 in FIG. 1.
Figure 3:
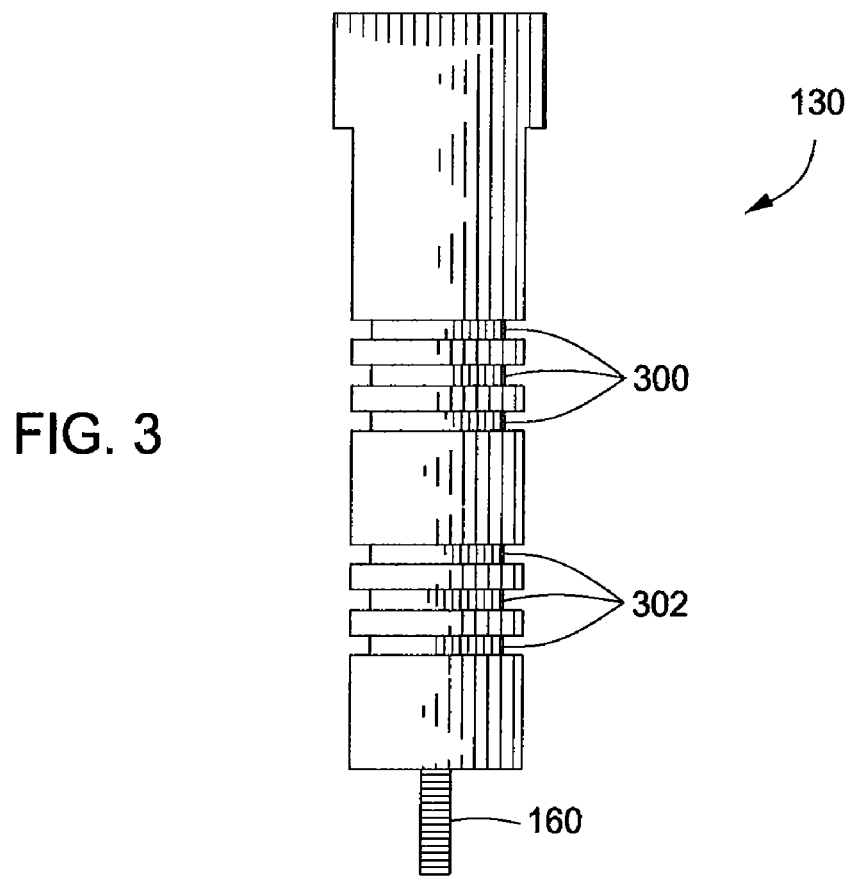
FIG. 3 is a view of a center tube in which air supply hoses may be protected and outer sections of the dense loader may be adjustably secured, according to some embodiments of the invention.
Figure 4:
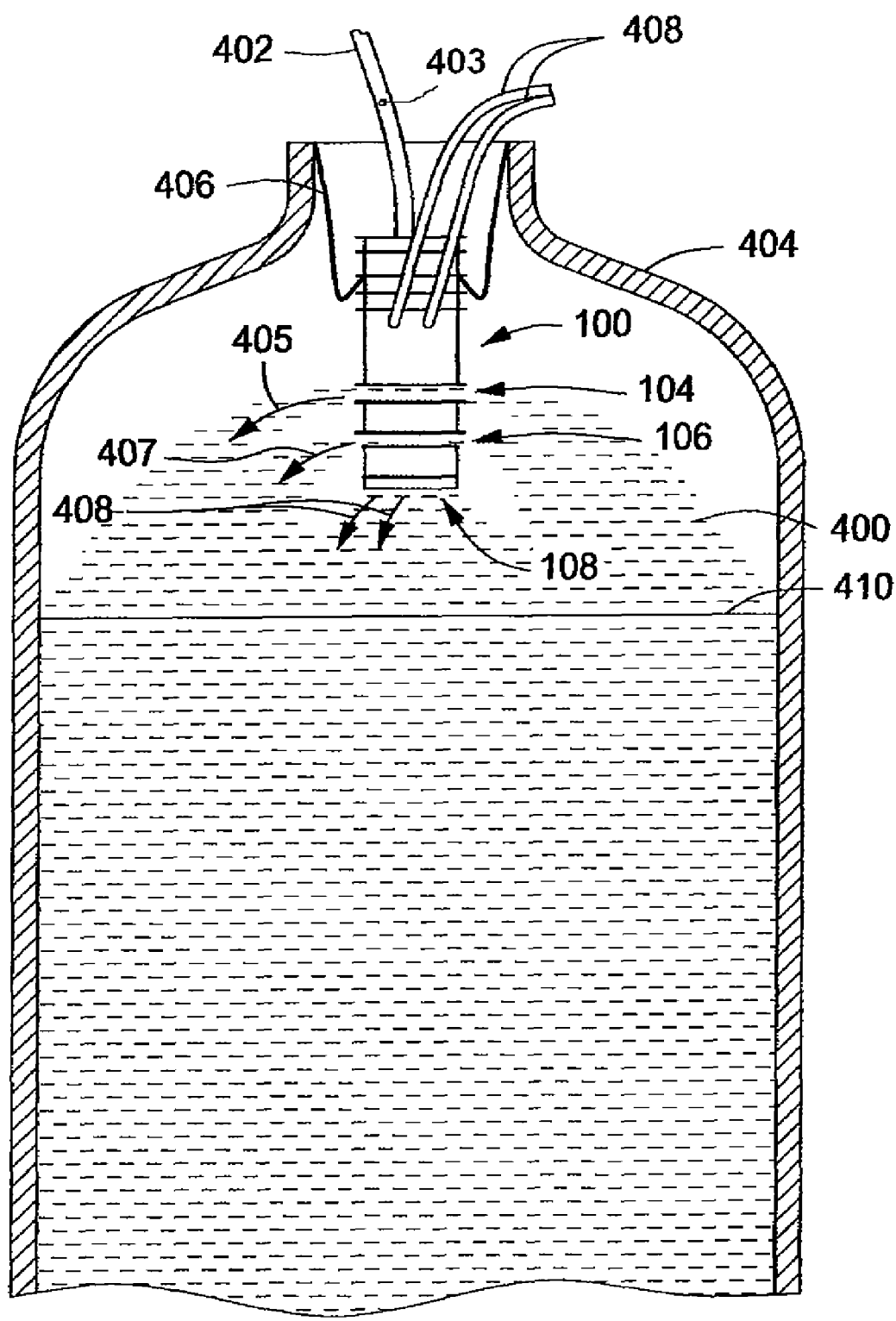
FIG. 4 is a partial cross section view of a reactor vessel showing the dense loader in operation.

FIG. 1 shows a pneumatic dense loader 100 that includes a tubular hopper body 102 with first, second and third staged outlets 104, 106, 108. For some embodiments, additional or fewer stages may be incorporated in the dense loader 100 depending on particular loading applications. The hopper body 102 may include an optional diffuser 109 for dispersing particles 400 (shown in FIG. 4) introduced into the hopper body 102 prior to the particles reaching the outlets 104, 106, 108. Conical shaped baffles 110 of the diffuser 109 held in the body 102 with radial bracing deflect the particles as the particles pass through the diffuser 109 negating or offsetting any possible effects on operation of the loader 100 caused by a sock 402 (shown in FIG. 4) conveying the particles to the loader 100 being off-center within the hopper body 102.

The first staged outlet 104 defines an annular passage 112 between the hopper body 102 and an inner wall 118. The passage 112 leads to a shelf 114 open to outside of the loader 100. Additionally, the first staged outlet 104 includes a first plurality of nozzles 116 outwardly directed and spaced around the shelf 114 along the inner wall 118 perpendicular to the shelf 114. In operation, the particles fall through the annular passage 112 onto or toward the shelf 114 prior to being propelled in a radial direction out of the loader 100 by gas or air supplied through the first plurality of nozzles 114. The second staged outlet 106 disposed below the first staged outlet 104 provides an analogous configuration using a second plurality of nozzles 120 independently controllable from the first plurality of nozzles 116. For some embodiments, the nozzles 116, 120 of each of the first and second staged outlets 104, 106 may define single circumferential respective slits where sufficient air flow is available to propel the particles.

The third staged outlet 108 includes a cone shaped plug 122 recessed from a bottom of the hopper body 102 such that a lip extension 124 of the loader 100 protects the plug 122 during handling. Apertures 126 through the plug 122 at various locations may permit passage of the particles out of the hopper body 102 underneath the loader 100. Further, a circumferential gap 128 (shown closed) may permit flow of the particles around the plug 122 and also below the loader 100. In contrast to the first and second staged outlets 104, 106, the third staged outlet 108 thus functions solely on gravity feed of the particles.

A center tube 130 extends through the hopper body 102 to interconnect each of the staged outlets 104, 106, 108. The center tube 130 enables adjustment of each of the staged outlets 104, 106, 108 as described herein and protects first and second hoses 132, 134 that respectively supply air to the first and second staged outlets 104, 106. The center tube 112 surrounds the hoses 132, 134 retaining the hoses 132, 134 ordered in a central region of the hopper body 102. Maintaining the hoses 132, 134 inside the center tube 130 prevents twining of the hoses 132, 134 throughout inside the hopper body 102 and thereby congesting even flow of the particles through the loader 100.

Fist spokes 136 couple the hopper body 102 to a first collar 138, which surrounds the center tube 130 to suspend the center tube 130 within the hopper body 102. For some embodiments a weld, an outward facing shoulder of the center tube 130, and/or a pin secures the center tube 130 relative to the first collar 138. As with a second or third collar 140, 142 shown adjustably disposed around the center tube 130 as described herein, the first collar 138 may permit adjustment too. Adjustability of either the first or second collars 138, 140 relative to the center tube 130 suffices to permit adjustment of the first staged outlet 104.

FIG. 2 illustrates a cross section of the loader 100 taken across line 2-2 in FIG. 1. Like the first collar 138, second spokes 144 radiate out from the second collar 140 to couple a first annular plenum section 146 of the hopper body 102 to the center tube 130. A set screw 200 locks the second collar 140 in an identified longitudinal location along the center tube 130. Where the second collar 140 is positioned on the center tube 130 controls spacing above the shelf 114 that opens the shelf 114 to outside the loader 100. This spacing acts as a governing orifice for the particles falling through the annular passage 112 so that quantity of the particles distributed by the first staged outlet 104 can be regulated to desired parameters depending on particular applications that the loader 100 is utilized and size of the particles.

FIG. 3 shows the center tube 130 in which the hoses 132, 134 may be protected. First grooves 300 around an outside diameter of the center tube 130 define possible locations that the set screw 200 may positively engage during adjustment of the first staged outlet 104. Similarly, second grooves 302 represent increments for longitudinally selecting the location of the third collar 142 for a corresponding adjustment of flow through the second staged outlet 106. While a total of six of the grooves 300, 302 are shown, the center tube 130 may include any number or spacing of the grooves 300, 302 to provide required adjustability.

Referring to FIG. 1, the third collar 142 couples a second annular plenum section 150 of the hopper body 102 to the center tube 130. The first and second annular plenums sections 146, 150 define double walled portions of the hopper body 102 having respective interior volumes with each providing fluid communication between first plenum inlets 152 and first plurality of nozzles 116 and second plenum inlets 154 and second plurality of nozzles 120, respectively. The first hose 132 thus connects a first connector 156 located on the outside of the hopper body 102 with the first annular plenum section 146 while the second hose 134 connects a second connector 158 located on the outside of the hopper body 102 with the second annular plenum section 150. Gas in the plenum sections 146, 150 can distribute directly to each of the respective first and second plurality of nozzles 116, 120. For some embodiments, the first plurality of nozzles 116 may include about seventeen individual nozzles while the second plurality of nozzles 120 may include about twelve separate nozzles. The plenum sections 146, 150 thereby eliminate the need for independent supply lines to each discrete one of the nozzles 116, 120 since such a multitude of lines can tend to add congestion to the interior of the hopper body 102 where the particles must pass. Instead of using a discrete air supply to each of the nozzles 116, 120, as few as one or two, as shown, of the plenum inlets 152, 154 for each of the plenum sections 146, 150 introduce air around the plenum sections 146, 150 and hence to corresponding ones of the nozzles 116, 120 without any intervening connections between the plenum sections 146, 150 and the nozzles 116, 120.

The plug 122 of the third staged outlet 108 also enables adjustment of the flow of the particles as may be required when utilizing the loader 100 in multiple different applications. The plug 122 attaches to the center tube 130 by fitting over a threaded end 160 and locking in position by a bolt (not shown) threaded on the threaded end 160. A first level of adjustment derives from the ability to replace the plug 122 with one having a desired number, size and location of the apertures 126. Furthermore, a second level of adjustment comes from the adjustability in position of the plug 122 along the threaded end 160 to control sizing of the circumferential gap 128 between the plug 122 and the inside diameter of the second annular plenum section 150 of the hopper body 102.

FIG. 4 illustrates the dense loader 100 in operation inside of a reactor vessel 404. The loader 100 hangs in the vessel 404 by a conveyance member such as chains 406 secured to the loader 100. External air lines 408 mate with the connectors 156, 158 to supply the air to the loader 100. The sock 402 conveys the particles 400 to inside of the loader 100. Adjustment of the loader 100 ensures dense loading of the particles 400 and achievement of a substantially planar top surface 410 formed by the particles 400 loaded in the vessel 404. As illustrated by a first arrow 405, the particles 400 dispensed by the first staged outlet 104 get cast the furthest out from the loader 100 with the particles 400 from the first staged outlet 104 mainly filling an area from an inner wall of the vessel 404 inward an identified distance. The second staged outlet 106 propels the particles 400 from the loader 100 as shown by a second arrow 407 to deposit the particles 400 inwardly from the identified distance that is covered with the first staged outlet 104 with some overlap in coverage. At least part of the difference in trajectory of the particles 400 from the first and second staged outlets 104, 106 occurs due to setting a pressure differential between corresponding ones of the air lines 408 that supply differing pressures to the first and second staged outlets 104, 106 via separate fluid communication pathways. Third and fourth arrows 408 depict the particles 400 dropped from the third staged outlet 108 thereby providing the particles 400 to a center region of the vessel 404 including directly beneath the loader 100.

Tubing referred to generically herein as the sock 402 used to convey the particles 400 to the loader 100 may include sections of rigid steel pipe and/or sections of flexible hose. High volume of the particles 400 flowing in the sock 402 can create a vacuum inside the sock 402 limiting ability to achieve desired flow rates. For some embodiments, the sock 402 may include an inline vacuum breaker 403 that relieves this pressure. Examples of the inline vacuum breaker 403 include a flap valve, a pressure relief valve, a stand pipe or any other type of opening that permits air to enter the sock 402 without allowing the particles 400 to escape.

Figure 5:
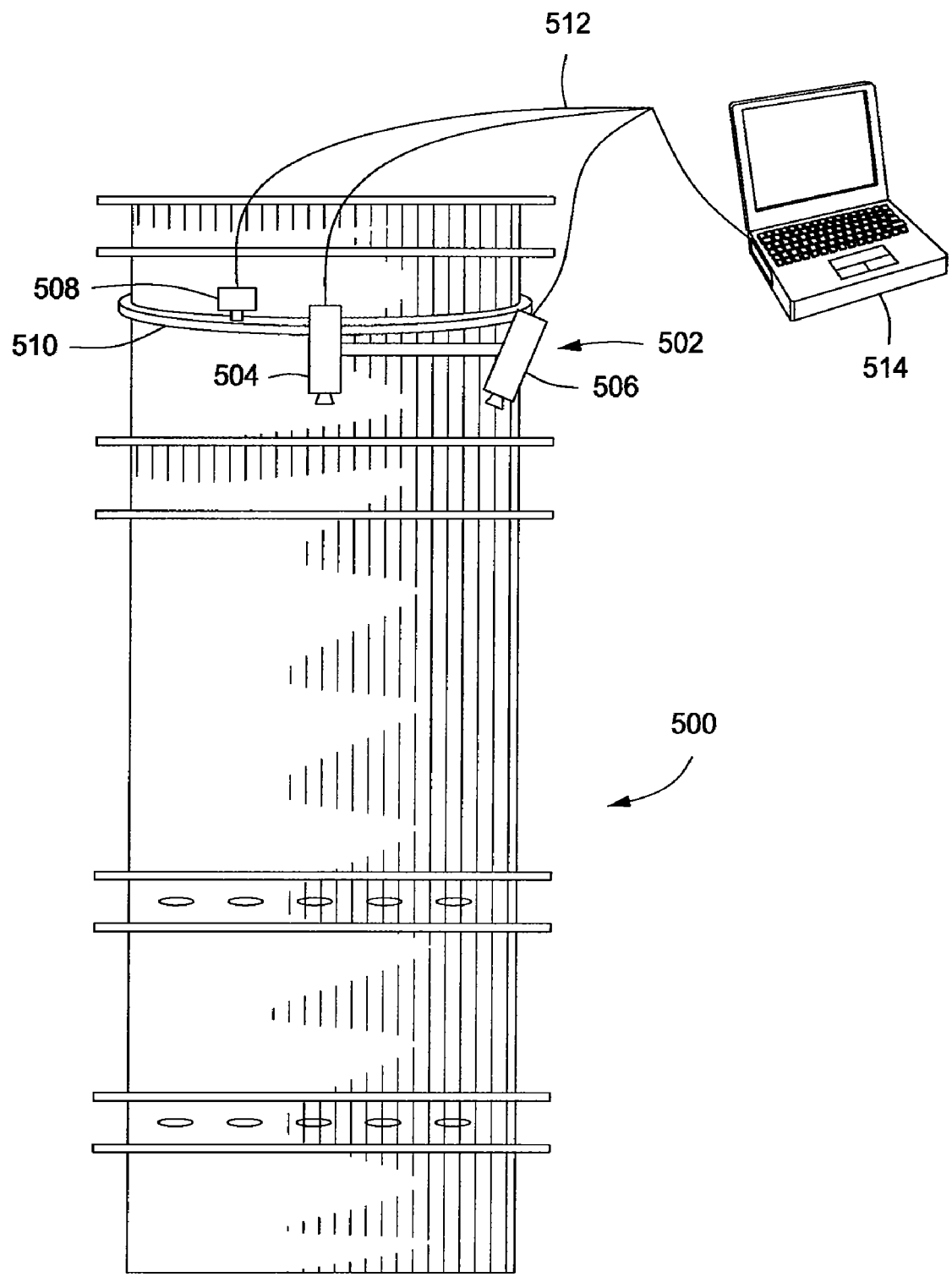
FIG. 5 is a view of a loader equipped with a laser sensor movable around a circumference of the loader for detecting a topographic level of particles loaded, according to one embodiment of the invention.

FIG. 5 illustrates a loader 500 equipped with a laser sensor 502 movable around a circumference of the loader 500 for detecting a topographic level of particles loaded. For some embodiments, the laser sensor 502 may mount on a separate conveyance holder independent of the loader 500. Further, longitudinal location of the laser sensor 502 along the loader 500 may vary with position of the laser sensor 502 selected to limit obstruction of the sensor 502 with scattering of the particles by the loader 500 and interference of the particles being dispensed with the sensor 502 should measurements be taken during operation of the loader 500. For example, disposing the laser sensor 502 in some embodiments between actively propelled stages of the loader 500 and gravity fed stages may reduce or eliminate any possible impact on particle distribution caused by protrusion of the sensor 502.

The laser sensor 502 includes a light source such as a laser 504 and a detector 506 such as a matrix photo-detector array, e.g., a charge-coupled device (CCD) camera. A motor 508 couples to the loader 500 to move the laser 504 and the detector 506 together around the loader 500 along a track 510. Scanning the topographic level of the particles loaded can occur with only one set of the laser 504 and the detector 506 so that costs associated with additional laser and detector equipment is not required. However, disposing multiple lasers or one laser with appropriate reflectors and one or more detectors around the loader 500 can decrease scanning time.

Control and instrumentation lines 512 couple the laser 504, the detector 506 and the motor 508 to a processor such as a laptop computer 514. For some embodiments, a lens of the laser 504 projects a line on a target (e.g., the top surface of the loaded particles), as described herein, and the distance to various points on the target is measured by triangulation, as is known, using the computer 514. The computer 514 may output a printout or display to a user the topographic level as a graphical representation or as particular values taken at discrete points. Further, the computer 514 may generate control signals for automatic or manual operational control of the loader 500. For example, operational control of the loader 500 may involve adjusting air pressure supply to staged outputs or restricting or increasing the flow path size for the particles through staged outlets.

For some embodiments, the computer 514 may include physical computer-readable storage medium containing processing algorithms with instructions for eliminating noise in readings from the sensor 502 caused by dust and/or falling particles. For example, initial measurements at a particular point may be accepted only after a confirmation measurement taken later in time matches the initial measurement. Filtering such as with the algorithm may block some measurements altogether that are too close to the sensor 502 to possibly correspond to the top surface of the loaded particles or are from certain wavelengths or intensities of light known to be associated with interaction of light from the laser 504 with dust. In addition, a de-duster device (shown schematically as block 600 in FIG. 6) such as a blower passing air across the particles prior to being introduced into the loader 500 may exhaust/filter dust and hence clean the particles prior to distribution by the loader 500. When the sensor 502 is not run simultaneously with operation of the loader 500 to dispense the particles, the sensor 502 may perform scanning at identified intervals when operation of the loader 500 is halted. Such identified intervals may be based on quantity of the particles loaded, for example, and permit adjustment of the loader 500 prior to recommencing operation of the loader 500 to compensate for any unwanted patterns in filling as determined by results of the scanning. For example, the scanning with the sensor 502 may reveal the appropriate time to adjust air pressure to staged outlets, which must occur as catalyst levels rise in a reactor during loading.

Figure 6:
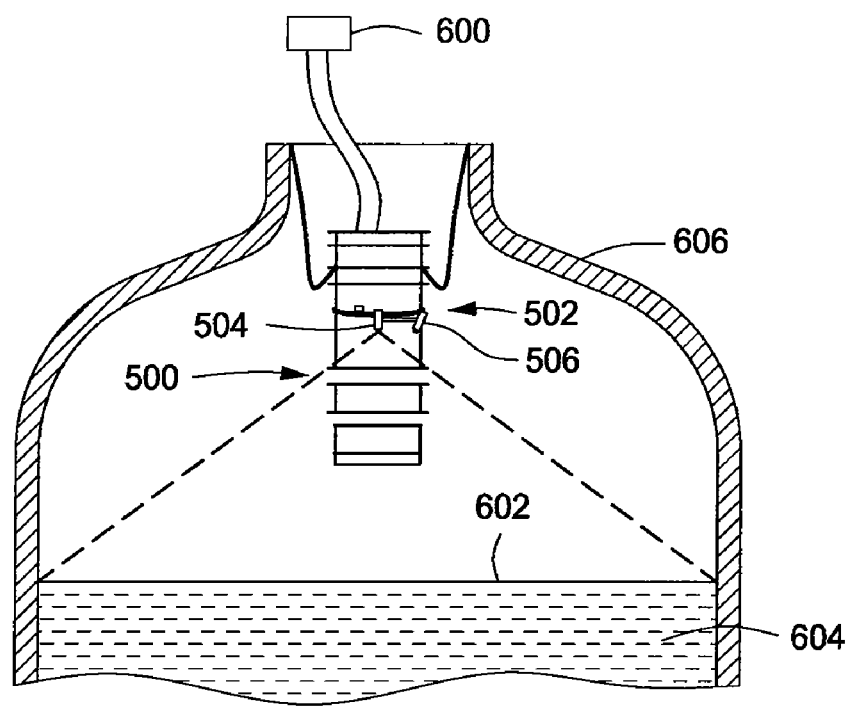
FIG. 6 is a partial cross section view of a reactor vessel showing laser scanning of a linear zone across a top surface of particles in the vessel.
Figure 7:
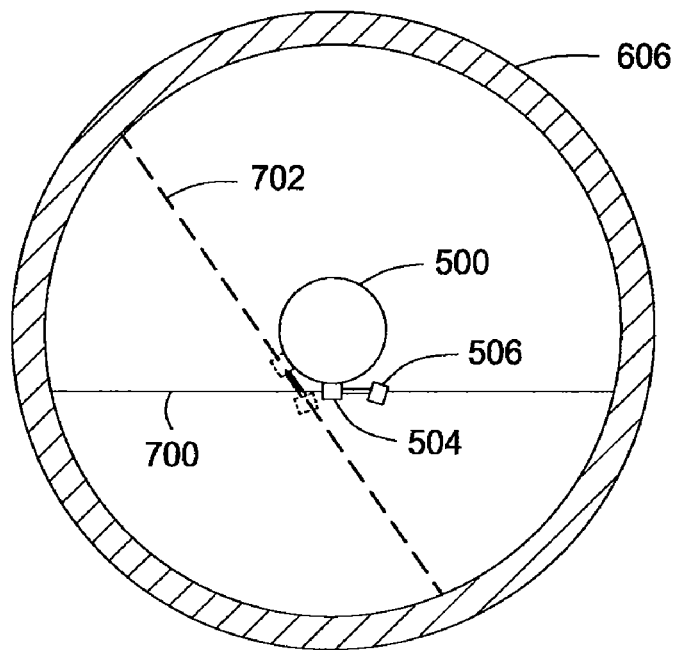
FIG. 7 is a top view of the reactor vessel shown in FIG. 6 with dashed delineations representing subsequent laser scanning of another zone angularly offset across the top surface of particles in the vessel.

FIGS. 6 and 7 illustrate the laser sensor 502 scanning first and second linear zones 700, 702 across a top surface 602 of particles 604 in a vessel 606. In some embodiments, the laser 504 may illuminate points or a line of points for detection in the linear zones 700, 702 instead of projecting and imaging light from a whole line at once. As shown in FIG. 7 by a top view, scanning of a first linear zone 700 with the sensor 502 occurs at a first time. The motor 508 then operates to increment the sensor 502 around the loader 500 as depicted by dashed delineations. For some embodiments, the loader 500 may rotate as a unit with the laser 504 so that the laser 504 can be fixed on the loader 500 and still achieve scanning around 360° of a cross sectional profile of the top surface 602 without the laser 504 moving relative to the loader 500. Next, laser scanning of the second zone 702 that is angularly offset from the first zone 700 occurs. Completeness of a topographical profile of the top surface 602 depends on how far the sensor 502 is incremented around the loader 500 between scans. As the increments decrease or become continuous completeness of the profile of the top surface 602 increases but time required for completing the scanning also increases such that a sufficient profile may be based on actual measurements taken with the sensor 502 at an identified number of the linear zones 700, 702. Averaging between the actual measurements may predict any unmeasured levels across the top surface 602 between the measurements taken across the top surface 602 at spaced intervals around 360°.

In some embodiments, the laser sensor 502 may project linear zones across a diameter of the vessel 606 to include a center of the vessel 606 in the profile created. The laser sensor 502 in such applications may be centered in the vessel 606 and in addition may couple to a bottom of the loader 500 such that the laser sensor 502 is disposed on a vertical centerline of the loader 500. In operation, the laser sensor 502 may remain centered and rotate about the vertical centerline without any offset. Even if offset from the center of the vessel 606, rotation of the laser sensor 502 may occur without any offset of the laser sensor 502 from an axis of the rotation.

While the foregoing is directed to embodiments of the present invention, other and further embodiments of the invention may be devised without departing from the basic scope thereof, and the scope thereof is determined by the claims that follow.

What is claimed is:

1. A loader for dispensing solid particles into a receptacle, comprising:
    a first, second and third hopper body sections defining an interior volume, wherein a mating relationship between the body sections forms at least two pathways between the body sections, each pathway leading to an outlet leading from the interior volume to an area outside of the loader, the outlets axially spaced along the loader and the pathways each including a surface for urging the particles towards the outlet;
    a gas nozzle disposed along the pathway and directed toward the opening; and
    a central member coupled to each of the body sections within the interior volume, wherein at least one of the hopper body sections is adjustable axially along the central member to vary a size of an associated outlet.

2. The loader of claim 1, further comprising a laser sensor coupled to at least one of the hopper body sections, wherein the laser sensor is configured to detect a topographic level of the particles loaded into the receptacle.

3. The loader of claim 2, further comprising a motor coupled to the laser sensor, which is drivable by the motor circumferentially about an exterior of the body sections.

4. The loader of claim 2, wherein the laser sensor includes a laser with an output that projects a line across the receptacle.

5. The loader of claim 2, wherein the laser sensor includes a laser movable such that an output of the laser projects multiple angularly offset linear detection zones around 360° of the receptacle.

6. The loader of claim 2, further comprising a processor configured to receive signals from the laser sensor, wherein physical computer-readable storage medium of the processor contains algorithms with instructions for eliminating noise in signals caused by at least one of dust and falling particles.

7. The loader of claim 1, wherein the nozzle and additional circumferentially spaced nozzles are disposed into a plenum of the second hopper body section.

8. The loader of claim 1, wherein one of the body sections is positively pinned relative to the central member by engagement with one of multiple longitudinally spaced grooves profiled in an outer surface the central member.

9. The loader of claim 1, further comprising a plug coupled to the central member, wherein the plug is movable along the central member to vary size of a circumferential gap between the plug and the second body section.

10. The loader of claim 1, further comprising a diffuser that is disposed in the first hopper body section and includes conical shaped baffles in a particle path to the outlet pathway.

11. A loader for dispensing solid particles into a receptacle, comprising:
    a hopper body section defining an interior volume and an outlet pathway between the interior volume and an opening to outside of the loader;
    a dispersion force imparting element disposed along the outlet pathway; and
    a laser sensor coupled to the hopper body section, wherein the laser sensor is configured to detect a topographic level of the particles loaded into the receptacle.

12. The loader of claim 11, further comprising a motor coupled to the laser sensor, which is drivable by the motor circumferentially about an exterior of the body section.

13. The loader of claim 11, wherein the laser sensor includes a laser with an output that projects a line across the receptacle.

14. The loader of claim 11, wherein the laser sensor includes a laser movable such that an output of the laser projects multiple angularly offset linear detection zones around 360° of the receptacle.

15. The loader of claim 14, wherein each of the linear detection zones is substantially across a diameter of the receptacle.

16. The loader of claim 11, further comprising a processor configured to receive signals from the laser sensor, wherein physical computer-readable storage medium of the processor contains algorithms with instructions for eliminating noise in signals caused by at least one of dust and falling particles.

17. A method of dispensing solid particles into a receptacle, comprising:
    providing a loader having a first, second and third hopper body sections defining an interior volume, wherein a mating relationship between the body sections forms at least two pathways between the body sections, each pathway leading to an outlet leading from the interior volume to an area outside of the loader, the outlets axially spaced along the loader and the pathways each including a surface for urging the particles toward the outlet;
    adjusting a size of the outlet;
    supplying the particles to the interior of the loader; and
    supplying gas to nozzles disposed along the pathway, thereby propelling the particles from the loader and dispensing the particles into the receptacle.

18. The method of claim 17, further comprising detecting a topographic level of particles loaded into the receptacle.

19. The method of claim 18, further comprising generating a control signal based on the topographic level detected to automatically adjust operation of the loader.

20. The method of claim 18, further comprising generating a control signal based on the topographic level detected to automatically adjust pressure of the gas supplied to the nozzles.

21. The method of claim 18, wherein the detecting occurs concurrently with the dispensing.

22. The method of claim 18, wherein the detecting further comprises,
    projecting a laser onto a top surface of loaded particles;
    imaging the top surface to provide signals for measuring the topographic level by triangulation; and
    removing noise from the signals caused by at least one of dust and falling particles.

23. The method of claim 18, wherein supplying the particles to the interior of the loader includes relieving a vacuum inside a conduit that conveys the particles.

24. A loader for dispensing solid particles into a receptacle, comprising:
    first and second hopper body sections defining an interior volume, wherein a mating relationship between the body sections forms an outlet pathway between the interior volume and an opening to outside of the loader;
    a gas nozzle disposed along the outlet pathway and directed toward the opening;
    a central member coupled to each of the body sections within the interior volume, wherein one of the hopper body sections is adjustable in position along the central member to vary a size of the opening; and a laser sensor coupled to the hopper body sections, wherein the laser sensor is configured to detect a topographic level of the particles loaded into the receptacle.

25. A loader for dispensing solid particles into a receptacle, comprising:

a hopper body section defining an interior volume and an outlet pathway between the interior volume and an opening to outside of the loader;

a dispersion force imparting element disposed along the outlet pathway;

a laser sensor coupled to the hopper body section, wherein the laser sensor is configured to detect a topographic level of the particles loaded into the receptacle; and a motor coupled to the laser sensor, which is drivable by the motor circumferentially about an exterior of the body section.

* * * * *